United States Patent [19]
Fleming

[11] Patent Number: 5,828,400
[45] Date of Patent: Oct. 27, 1998

[54] METHOD FOR CONSTRUCTING A LIGHT-EMITTING DIODE PRINTHEAD WITH A MULTIPLE DPI RESOLUTION DRIVER IC

[75] Inventor: Paul John Fleming, Lima, N.Y.

[73] Assignee: Eastman Kodak Company, Rochester, N.Y.

[21] Appl. No.: 580,262

[22] Filed: Dec. 28, 1995

[51] Int. Cl.$^6$ ............................... B41J 2/47; B41J 2/435; B41J 2/45
[52] U.S. Cl. ............................................ 347/238; 347/237
[58] Field of Search ................................. 347/238, 237, 347/240, 50; 257/91, 99

[56] References Cited

U.S. PATENT DOCUMENTS

| | | | |
|---|---|---|---|
| 4,951,098 | 8/1990 | Albergo et al. | 357/17 |
| 5,307,089 | 4/1994 | Takasu et al. | 347/237 |
| 5,317,344 | 5/1994 | Beaman et al. | 346/107 |
| 5,389,953 | 2/1995 | Agar et al. | 346/1.1 |

OTHER PUBLICATIONS

US Patent Application 07/581,825, filed Sep. 12, 1990 in the names of LaPointe et al.

*Primary Examiner*—N. Le
*Assistant Examiner*—Thinh Nguyen
*Attorney, Agent, or Firm*—Norman Rushefsky

[57] ABSTRACT

A method for connecting selected bonding pads of a universal current driver IC supporting a maximum resolution, e.g., 600 DPI, with the appropriate bonding pads of the same or a lower resolution LED chip array. The output pads of the current driver IC and the pads of the LED elements of each LED chip array or segment are matched so that wire bonding takes place between the physically closest pads. Consequently, the universal current driver IC may be employed with LED chips or segments of a certain standardized length that contain 96 LED elements for 300 DPI, 128 LED elements for 400 DPI, and 192 LED elements for 600 DPI or the like. The selection algorithm, in picking the physically closest IC current driver pad to be connected to an LED element pad leaves certain stages of the IC driver unconnected.

19 Claims, 4 Drawing Sheets

| A | B | C | D | E | F | G | H |
|---|---|---|---|---|---|---|---|
| 42 | 2635.25 | 2622.281 | 2487.406 | | 3496.375 | 58 | |
| 43 | 2698.75 | 2685.469 | 2547.344 | | 3580.625 | 59 | |
| 44 | 2762.25 | 2748.656 | 2607.281 | | 3664.875 | 60 | |
| 45 | 2825.75 | 2811.844 | 2667.219 | | 3749.125 | 61 | |
| 46 | 2889.25 | 2875.031 | 2727.156 | | 3833.375 | 62 | |
| 47 | 2952.75 | 2938.219 | 2787.094 | | 3917.625 | 63 | |
| 48 | 3016.25 | 3001.406 | 2847.031 | | 4001.875 | 64 | |
| 49 | 3079.75 | 3064.594 | 2906.969 | | | | |
| 50 | 3143.25 | 3127.781 | 2966.906 | | | | |
| 51 | 3206.75 | 3190.969 | 3026.844 | | | | |
| 52 | 3270.25 | 3254.156 | 3086.781 | | | | |
| 53 | 3333.75 | 3317.344 | 3146.719 | | | | |
| 54 | 3397.25 | 3380.531 | 3206.656 | | | | |
| 55 | 3460.75 | 3443.719 | 3266.594 | | | | |
| 56 | 3524.25 | 3506.906 | 3326.531 | | | | |
| 57 | 3587.75 | 3570.094 | 3386.469 | | | | |
| 58 | 3651.25 | 3633.281 | 3446.406 | | | | |
| 59 | 3714.75 | 3696.469 | 3506.344 | | | | |
| 60 | 3778.25 | 3759.656 | 3566.281 | | | | |
| 61 | 3841.75 | 3822.844 | 3626.219 | | | | |
| 62 | 3905.25 | 3886.031 | 3686.156 | | | | |
| 63 | 3968.75 | 3949.219 | 3746.094 | | | | |
| 64 | 4032.25 | 4012.406 | 3806.031 | | | | |

| A | B | C | D | E | F | G | H |
|---|---|---|---|---|---|---|---|
| N | P$_{LED}$ | S | T | | N$_{PRIME}$ | P$_{LEDPRIM}$ | S$_{PRIME}$ |
| 128 | 63.5 | 20 | 228 | | 96 | 84.66667 | 20 |
| M | D$_{LED}$ | D$_{LEDBP}$ | D$_{DVRBP}$ | | D$_{LEDBP}$ PRIME DRIVER M | | |
| 1 | 31.75 | 31.59375 | 29.96875 | | 42.125 | 1 | |
| 2 | 95.25 | 94.78125 | 89.90625 | | 126.375 | 3 | |
| 3 | 158.75 | 157.9688 | 149.8438 | | 210.625 | 4 | |
| 4 | 222.25 | 221.1563 | 209.7813 | | 294.875 | 5 | |
| 5 | 285.75 | 284.3438 | 269.7188 | | 379.125 | 7 | |
| 6 | 349.25 | 347.5313 | 329.6563 | | 463.375 | 8 | |
| 7 | 412.75 | 410.7188 | 389.5938 | | 547.625 | 10 | |
| 8 | 476.25 | 473.9063 | 449.5313 | | 631.875 | 11 | |
| 9 | 539.75 | 537.0938 | 509.4688 | | 716.125 | 12 | |
| 10 | 603.25 | 600.2813 | 569.4063 | | 800.375 | 14 | |
| 11 | 666.75 | 663.4688 | 629.3438 | | 884.625 | 15 | |
| 12 | 730.25 | 726.6563 | 689.2813 | | 960.875 | 17 | |
| 13 | 793.75 | 789.8438 | 749.2188 | | 1053.125 | 18 | |
| 14 | 857.25 | 853.0313 | 809.1563 | | 1137.375 | 19 | |
| 15 | 920.75 | 916.2188 | 869.0938 | | 1221.625 | 21 | |
| 16 | 984.25 | 979.4063 | 929.0313 | | 1305.875 | 22 | |
| 17 | 1047.75 | 1042.594 | 988.9688 | | 1390.125 | 24 | |
| 18 | 1111.25 | 1105.781 | 1040.906 | | 1474.375 | 25 | |
| 19 | 1174.75 | 1168.969 | 1108.844 | | 1558.625 | 27 | |
| 20 | 1238.25 | 1232.156 | 1168.781 | | 1642.875 | 28 | |
| 21 | 1301.75 | 1295.344 | 1228.719 | | 1727.125 | 29 | |
| 22 | 1365.25 | 1358.531 | 1280.656 | | 1811.375 | 31 | |
| 23 | 1428.75 | 1421.719 | 1348.594 | | 1895.625 | 32 | |
| 24 | 1492.25 | 1484.906 | 1408.531 | | 1979.875 | 34 | |
| 25 | 1555.75 | 1548.094 | 1468.469 | | 2064.125 | 35 | |
| 26 | 1619.25 | 1611.281 | 1528.406 | | 2140.375 | 36 | |
| 27 | 1682.75 | 1674.469 | 1588.344 | | 2232.625 | 38 | |
| 28 | 1746.25 | 1737.656 | 1648.281 | | 2316.875 | 39 | |
| 29 | 1809.75 | 1800.844 | 1708.219 | | 2401.125 | 41 | |
| 30 | 1873.25 | 1864.031 | 1768.156 | | 2485.375 | 42 | |
| 31 | 1936.75 | 1927.219 | 1828.094 | | 2569.625 | 43 | |
| 32 | 2000.25 | 1990.406 | 1888.031 | | 2653.875 | 45 | |
| 33 | 2063.75 | 2053.594 | 1947.969 | | 2738.125 | 46 | |
| 34 | 2127.25 | 2116.781 | 2007.906 | | 2822.375 | 48 | |
| 35 | 2190.75 | 2179.969 | 2067.844 | | 2906.625 | 49 | |
| 36 | 2254.25 | 2243.156 | 2127.781 | | 2990.875 | 50 | |
| 37 | 2317.75 | 2306.344 | 2187.719 | | 3875.125 | 52 | |
| 38 | 2381.25 | 2369.531 | 2247.656 | | 3159.375 | 53 | |
| 39 | 2444.75 | 2432.719 | 2307.594 | | 3243.625 | 55 | |
| 40 | 2508.25 | 2495.906 | 2367.531 | | 3327.875 | 56 | |
| 41 | 2571.75 | 2559.094 | 2427.469 | | 3412.125 | 57 | |

FIG. 6A

METHOD FOR CONSTRUCTING A LIGHT-EMITTING DIODE PRINTHEAD WITH A MULTIPLE DPI RESOLUTION DRIVER IC

CROSS-REFERENCE TO RELATED APPLICATIONS

This application is related to the following applications filed concurrently herewith each in the names of Paul J. Fleming et al:
1. U.S. patent application Ser. No. 08/581,025, entitled "LED Printhead and Driver Chip for Use Therewith Having Boundary Scan Test Architecture."
2. U.S. patent application Ser. No. 08/579,954, entitled "Printer With Driver IC Configurable for Recording In Multiple Resolutions."
3. U.S. patent application Ser. No. 08/580,403, entitled "Driver IC With Automatic Token Direction Self-Sensing Circuitry."

FIELD OF THE INVENTION

The present invention relates to a method for constructing light-emitting diode (LED) printheads and more particularly to the interconnection of selected driver output circuit terminals of a multiple DPI resolution IC with LED elements of differing dots-per-inch (DPI) chip arrays.

BACKGROUND OF THE INVENTION

The increasing use of information processing devices such as word processors, high speed photocopiers, and the like has resulted in the emergence of various types of printers to output the information. For applications in which the emphasis is on quietness, high speed and high print quality, the most extensively used printers are electrophotographic printers. Laser printers and liquid-crystal printers are two examples of such printers, but in addition there is the LED printer, which uses a printhead comprised of an array of LED elements. In the LED printer, printing involves using image data signals applied to LED driver integrated circuits (ICs) to drive the printhead LED array elements and form an electrostatic latent image on a photosensitive drum, and the image is then developed and transferred to paper.

In order to print a line of print across standard width paper with sufficient resolution, linear LED printheads are constructed of a series of LED chip arrays and associated driver chips wherein the LED chip arrays each typically comprise an array of 64, 96, 128, or 196 LED elements. The LED elements are lined up side-by-side in a row and each occupies a certain amount of space on the chip array. The physical size and spacing of the LED elements, together with the appropriately sized SELFOC lens array, provides standard resolution levels for printheads such as 200, 240, 300, 400, 480 and 600 DPI (7.87, 9.45, 15.75, 18.90, 23.62 DPmm).

For manufacturing tooling and parts commonalty in assembly, it is desirable to manufacture LED chip arrays that contain 96 LED elements for 300 DPI, 128 LED elements for 400 DPI, and 192 LED elements for 600 DPI (or an equivalent ratio) as this results in LED arrays of the same length, but with differing LED element density and resolution. The arrays differ dimensionally in the size (width and length) and the spacing of the active regions forming the LED elements on each array. Typically, the distance between adjacent integrated circuit LED elements on each array must be maintained at a certain minimum distance.

When the current driver IC is designed, it is intended for use with an LED array having just one specific resolution. Consequently, separate current driver ICs having an appropriate matching number of LED element driver channels are manufactured for each resolution LED array.

In such optical printer printheads, the LED array and LED driver circuit ICs are mounted on a metallic "tile", a ceramic substrate or a printed circuit board, and the appropriate terminal or bonding pads of each are electrically connected by wire bonding. FIG. 1 shows a conventional method of mounting an optical printer LED chip array and LED driver ICs where the odd and even numbered LED elements are connected to odd and even driver circuit ICs. While not shown in FIG. 1, there are additional LED chip arrays and LED driver ICs provided in similar arrangement so that the LED arrays form a straight row as do the odd and even LED driver ICs. In this regard, reference is made to U.S. Pat. No. 5,317,344, and U.S. Pat. No. 5,389,953, the contents of which are incorporated by reference and to commonly assigned U.S. application Ser. No. 07/581,825, filed Sep. 12, 1990 in the names of LaPointe et al and now abandoned. An optical printhead LED chip array 10 and the driver ICs 12 and 14 are arranged side-by side in a straight line on a printed circuit board 16 and bonded thereto with an adhesive such as silver epoxy resin. The LED chip array 10 comprises the fixed number, e.g. 96, individual LED elements 18, wherein the 48 odd and even LED elements each are electrically connected to an associated bonding pad arranged in pad arrays 26 and 28 on the chip array and these pad arrays extend alongside the driver ICs 12 and 14. The driver ICs 12, 14 each have a pad array of driver IC bonding pads 22 and 24, respectively, that are lined up adjacent to the LED pad arrays 26 and 28 and adjacent pads of driver pads and LED pads are connected to each other by wire bonding using conductive wires 30 several tens of micrometers in diameter of gold, aluminum or the like, to thereby enable the LED elements to be driven by the driver circuit ICs 12 and 14. Using wire bonding to fabricate an LED array for an A4-size 400 DPI printhead, for example, involves some 4000 wire-bonding operations, so that even a very low defect rate can lower the yield, thereby increasing costs.

The process of bonding the wires 30 to the respective pairs of bonding pads requires a certain contact width to effect. Specifically, as the width of the contact points is about 100 $\mu$m when a ball bonder is used and 50 $\mu$m when a wedge bonder is used, the maximum printhead LED array density that can be connected by this method is around 1200 DPI (47.24 DPmm), assuming the driver circuit ICs 12 and 14 are mounted on both sides of the LED chip array 10 and the bonding pad arrays 26 and 28 are arranged in a zigzag configuration as shown in FIG. 1. Moreover, the conventional arrangements use bonding pads that are 100 $\mu$m or more in length.

Although it is possible to achieve high density of pads per inch, well in excess of the DPI resolution requirements for a number of applications, it is conventional practice to separately fabricate a matching LED driver circuit IC for either single sided or double sided assembly as shown in FIG. 1 where the driver circuit pads are spaced apart in the array in a spacing matching the spacing of the respective LED element pads. Wire bonding equipment is configured to extend the bonding wires in parallel consistently with the spacing.

In the semiconductor device fabrication process where large numbers of IC devices are fabricated on a wafer of semiconductor material, interchange ability of ICs is desirable to increase fabrication efficiency and lowering of the cost. As, in the case of an LED array, the length of chip array is determined by the number and density of the pixels, any cost reductions realized by improving fabrication efficiency is a worthwhile achievement. Separately fabricating the dedicated driver circuit ICs to match each of the varying resolution DPI LED arrays has presented a major expense.

SUMMARY OF THE INVENTION

It is therefore an object of the present invention to provide a light-emitting diode printhead that uses LED chip arrays of a resolution selected from plural differing DPI resolutions with LED driver circuit chips that are adapted to be adjusted for the different LED chip arrays and that can be readily fabricated using present-day technology. The invention however is not limited to recording elements that are LEDs as other recording elements whose connectability can benefit from the teachings provided herein are also contemplated.

Expressed in a different manner, it is an object of the present invention to employ a single current driver IC which is capable of being connected with and operating multiple DPI resolution LED arrays in conjunction with a method of making the interconnections of the current driver IC and LED chip array pads.

In satisfaction of these objects, a method in accordance with the invention connects selected pads of a standardized current driver IC supporting the maximum resolution, e.g., 600 DPI, with the appropriate pads of an LED chip array. In accordance with the method of the present invention, the output pads of the current driver IC and the pads of the LED elements of each LED chip or segment are matched so that wiring bonding takes place between the physically closest pads. Consequently, the universal current driver IC may be employed with LED chip arrays or segments of a certain standardized length that contain 96 LED elements for 300 DPI, 128 LED elements for 400 DPI, and 192 LED elements for 600 DPI or the like. The selection algorithm, in picking the physically closest IC current driver pad to be connected to an LED element pad leaves certain stages of the IC driver unconnected, and the unconnected stages of the current driver IC or ICs are electronically bypassed. Alternatively, in manufacturing, the unselected IC driver stages may be bypassed by hard wiring.

In accordance with the present invention, these objects are attained by a light-emitting diode printhead comprising: a light-emitting diode array comprising a first plurality of connector pads and light-emitting diode elements each coupled to one of said connector pads, the first plurality of diode elements and connector pads arrayed in a set direction and separated apart in a first pitch; a light-emitting diode driver circuit array comprising a second plurality of driver circuits and output pads coupled thereto having a second pitch; and interconnection means for connecting all of the light-emitting diode pads with a driver circuit pad so that the nearest pair of respective driver circuit and light-emitting diode pads are electrically connected.

In accordance with a preferred embodiment of the invention, the varying density LED arrays are constructed in array segments that are constant in length and the current driver IC is constructed in a single, comparable length so that the array lengths of the connector pads are comparable. Selection of the current driver and light-emitting diode pads to be interconnected is commenced at the mid-point of each pad array and continues toward each end in the line print direction.

In the design of such a universal current driver IC, it is necessary to implement a means of selecting the resolution of the array it will operate. When the LED array resolution is below the maximum the current driver IC is designed for, the unselected driver circuits are disabled or bypassed. During assembly, the pads coupled to these disabled or bypassed driver circuits are not connected to any pads of the LED array.

A primary advantage of the present invention is the ability to use the same current driver IC for LED or other type of print elements in the fabrication of low, medium and high resolution printheads which leads to increased volume, reducing the cost associated with separate current driver ICs. The ability of the current driver IC to be programmed for operating current level makes it possible to adjust the current driver IC to match the differing current levels required by LED arrays of differing DPI resolutions.

Additionally, the method of the present invention makes it possible to use the high DPI resolution driver ICs which fail on one or more output channels with lower DPI resolution LED arrays as long as the failed channels correspond to ones that may be readily bypassed at the lower resolution.

BRIEF DESCRIPTION OF THE DRAWINGS

Further objects, advantages and features of the invention in its various embodiments will become more apparent from the accompanying drawings and following detailed description of the invention, wherein:

FIG. 5 is a schematic view of an end of an LED chip array illustrating a dimension "S"; and FIGS. 6A and 6B are a table illustrating data used in determining connections of driver chip bonding pads to LED bonding pads.

DETAILED DESCRIPTION OF THE PREFERRED EMBODIMENTS

Figure 1:
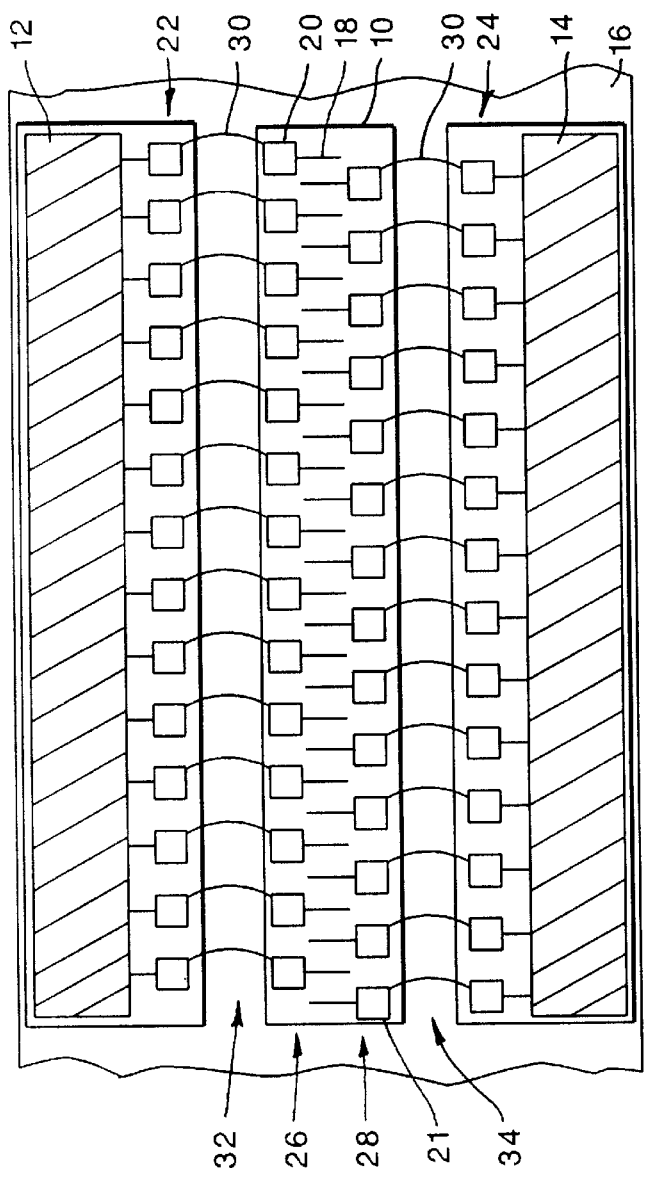
FIG. 1 shows a plan view in schematic of an LED printhead comprised of conventional or prior art LED array chip arrays (only one shown) and illustrating the wire bonding between two driver IC pad arrays and the LED chip array pad arrays.

Referring again to FIG. 1, as described above, it is a simplified plan view of a first example of a conventional, double sided LED printhead coupling the elements of an LED chip array to the stages or channels of a pair of driver ICs. In this arrangement, a number of LED elements 18 are arrayed in a row at a constant LED pitch length $P_{LED}$ longitudinally along an LED chip array 10, and emit light in accordance with current supplied via the respective electrodes of each LED element 18. The LED pads 20, 21 of each LED array are arranged along each side across the width of the LED array 10 so that the pads 21 in the row 28 coupled with odd-numbered (from the left) LED elements 18 are at one side facing gap 34 and the pads 20 in the row 26 coupled with even-numbered LED elements 18 are at the other side facing gap 32. As a result, at each side, the LED pad array's bonding pad pitch length $P_{BP1}$ is twice the LED element pitch length $P_{LED}$. The rows of pads 22 and 24 of driver circuit ICs 12 and 14 are arranged on the other side of the gaps 32 and 34, respectively, and have a driver circuit pad pitch length $P_{BP2}$ which is the same as the pitch length $P_{BP1}$.

Since the pitch lengths and numbers of bonding pads in each facing row 22, 26 and 24, 28 are the same, the bonding wires 30 may be extended across the gaps 32 and 34 and attached in the conventional fashion at a fixed angle. The bonding wires generally extend outward from the plane of FIG. 1, and are shown extending in a curved line to figuratively illustrate that outward extension. FIG. 1 simply illustrates the conventional practice of providing matching driver IC and LED chip array bonding pad layouts.

In accordance with the present invention, the current driver IC design is altered from that shown in FIG. 1 in two major respects. First, a universal, high resolution driver IC is employed having an array of current driver stages or channels and pads sufficiently closely spaced to support the highest density LED arrays available. Secondly, selected ones of the driver IC pads are interconnected with the LED element pads, and the driver IC is configured mechanically and/or electrically to bypass unconnected pads of unused driver channels. For example, if the driver IC is fabricated with 128 driver circuits for 400 DPI resolution, it may be operated in a lower density mode to cause every fourth output to be skipped, whereby only 96 current driver circuits are active and a 300 DPI LED array is supported.

Configuring the driver IC to support a lower resolution LED array may be accomplished by bonding one or more control pads to ground or to a bias voltage disabling the particular current driving channels or inputting configuration information digitally via serial or parallel control paths. Where the driver chip includes a shift register for shifting data into the driver chip data from a rasterized data source, the data may be adjusted by adding filler bits at appropriate locations in the data stream so that no real image data is received at the registers that control the current to the driver channels that are not to be implemented or driven in the particular application, or bypassing those shift register cells associated with unused channels avoiding the need for data padding. In this regard reference may be had to the application to which cross-reference is recited above which provides description of a preferred embodiment of a driver chip circuit that features token bit latching of data in respective channels with selective skipping of certain unused channels.

In another example, a universal current driver IC having 192 current driver circuits may be employed for 600 DPI resolution LED arrays. By introducing a mode of operation where every other driver circuit is disabled and bypassed, then the same driver chip will support 300 DPI LED arrays. In addition, a mode may be introduced to skip every third driver circuit to thus support 400 DPI resolution LED arrays. However, due to fabrication and layout constraints, it is not always possible to simply skip every nth driver circuit and associated pad. The physical mounting of the driver ICs, in single and double sided configurations, adjacent to the LED chip arrays and on the tile, substrate or printed circuit board makes it necessary to select the physically closest LED and driver IC bonding pads, even if the selection alters the regularity of the skipping pattern of bypassed driver circuits. Moreover, there are examples of DPI resolutions derived from a 96, 128, or 192 current driver channel IC configurations where it would not be possible to skip every nth driver circuit.

A problem arises from the end-to-end layout of the LED arrays and associated driver ICs to provide a printhead which is long enough to extend across the print width of the media or paper to be printed. In photocopiers, where it is desired to print text or images from data stored electronically by exposing the photosensitive imaging layer to the elongated LED printhead, it is necessary to provide a printhead length sufficient to make the full sized copies. The end LED elements 18 of each adjoining LED chip array 10 must be spaced the same distance apart as the adjacent LED elements on the LED chip array.

The skew of the adjacent pairs of LED and driver IC pads to be attached by wire bonding cannot exceed a certain angle because the automated wire bonding equipment operates within a narrow angular displacement range. The adjacent pads 20, 22 and 21, 24 shown in FIG. 1 have the same pitch, and the sets of wires 30 extend at a constant angle with respect to one another across the gaps 32 and 34 in the shortest possible path and are of equal length. Changing the pitch length of the LED element pads from that shown in FIG. 1 necessarily involves a lengthening of the path across the gaps 32 and 34 and the consequent length of the wires.

Figure 2:
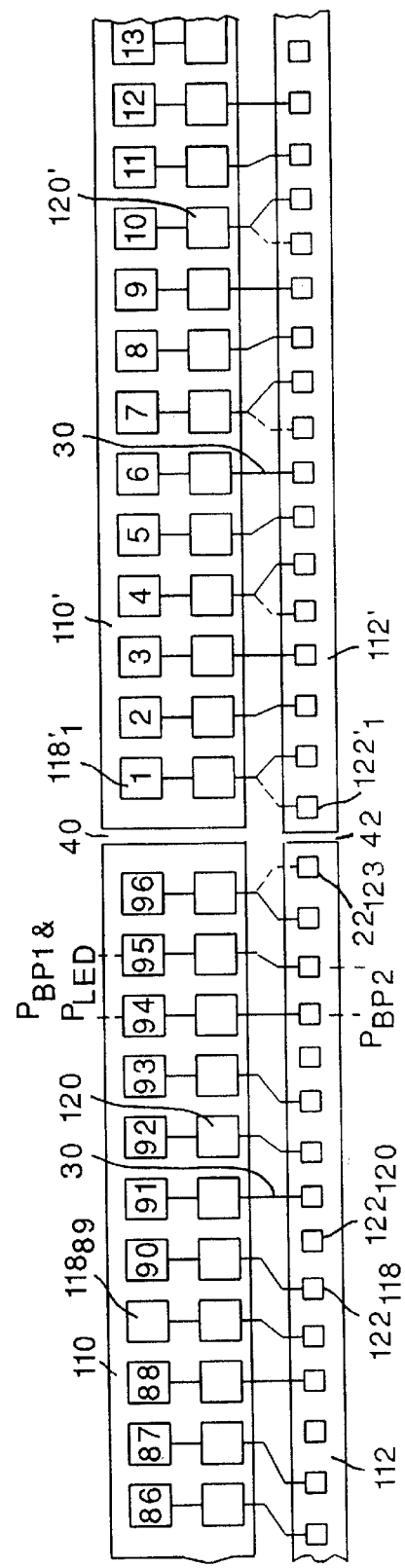
FIG. 2 is a schematic view of a first example of a printhead featuring the interconnection of a universal driver circuit IC with a conventional LED chip array wherein the number and pitch of the driver circuit and LED wirebonding pads differ.

FIG. 2 is a simplified schematic illustration of the effect of coupling 300 DPI LED chip arrays 110, 110' each having 96 LEDs 118 with 400 DPI bond pads on driver ICs 112, 112' and skipping every fourth driver IC current driving circuit or channels in a single-sided printhead(which is shown as an example to facilitate discussion, the invention is, of course, useful for the double IC configuration shown in FIG. 1). Assume the driver ICs 112, 112' each has 128 current driving channels. In this illustration, the LED array element pitch length $P_{LED}'$ is equal to the bonding pad 120, 120' pitch length $P_{BPLED}$. However, the current driver IC 112, 112' bonding pads 122, 122' pitch length, $P_{BPCD}'$ is not the same as the pitch $P_{BPLED}$. The skew of the wires 30, 30' ranges from straight to highly angled if the strict regimen of skipping every nth connection is followed. In this particular illustration, a starting point for determining the nth position is selected to be the center numbered pad of $122_{63}$ (not shown) of the driver IC 112 and the center numbered pad $122_{63}$ (not shown) of the driver IC 112'.

During construction, it is critical to maintain the spacing 40 between adjacent LED chip arrays, e.g. 110 and 110', constant across LED chip array boundaries to maximize image quality as described above. This requires the LED chip array spacing 40 to be small, resulting in the need for highly accurate dimensional control when they are separated from the wafer and very accurate relative placement during printhead construction. The current driver ICs, e.g. 112 and 112', do not require as accurate placement if they are sized so that their lengths are smaller than the LED array IC lengths. This length difference may itself additionally skew the pitch of the rows of current driver pads 122, 122', with respect to the rows of adjacent LED array pads 120, 120', . . . , even if they are equal in number. As the current driver IC length is reduced to aid in manufacturing, it becomes necessary to attach the wires 30 to more of the driver IC pads 122, 122' in a region near the ends of the driver ICs 112, 112' and thus to fewer of the inner driver IC pads 122, 122', in order to minimize angling or skew of wires 30, 30'.

In practice, skipping every nth driver circuit is therefore not the best solution to the problem of using the universal, high density current driver ICs 112, 112' for multiple density LED arrays. The result is that it is not optimal to skip every fourth current driver pad 122, 122', but rather a complex solution results which is dependent on the actual wirebond pad locations on both the driver circuit ICs 112, 112' and the LED chip arrays 110, 110'.

Figure 3:
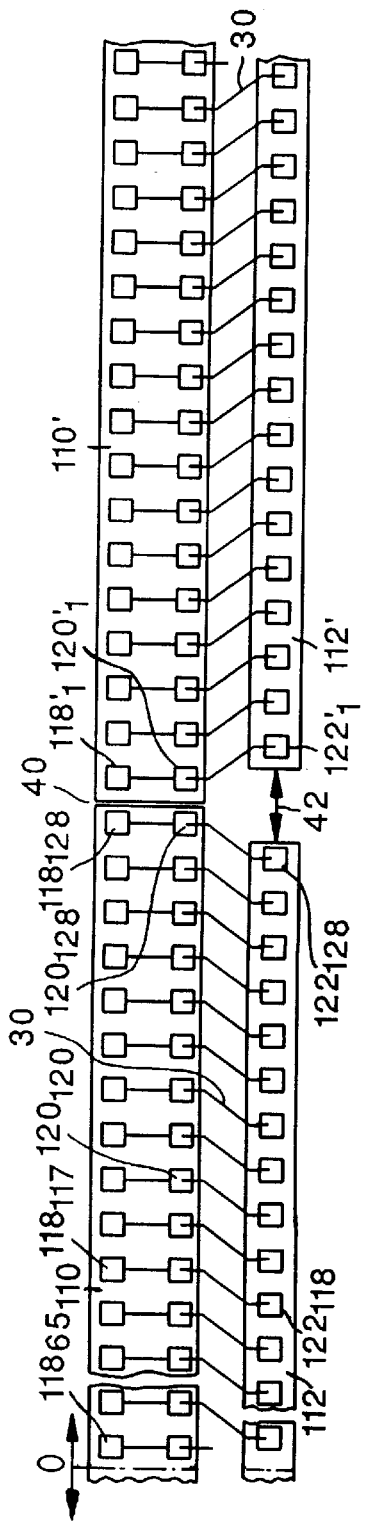
FIG. 3 is a schematic view of the interconnection of a conventional driver circuit IC with a conventional LED printhead wherein the number and pitch of the driver circuit and LED wirebonding pads is the same or slightly different but the length of the driver circuit and LED array ICs differ.

FIG. 3 schematically illustrates (again in a single-sided bonding embodiment as an example and to facilitate discussion) the effect of using shorter length current driver ICs 112 and 112' coupled to end-to-end mounted LED element chip arrays 110 and 110', respectively. Although not specifically shown, the current driver IC end-to-end spacing 42 is repeated at each end of the current driver ICs 112, 112'. Consequently, even if the number of LED elements and driver current driving channels are equal, the angle of pitch of the wires 30 is slightly and progressively altered along the length of the side-by-side mounted current driver and opposing LED array, progressing from a negative angle of pitch as shown to a neutral angle of pitch at the center point (pad 122$_{63}$) of the length of the driver IC and then to a mirror image, positive angle of pitch as the other end is reached. This angle of pitch and the spacing 42 is exaggerated in FIG. 3.

Figure 4:
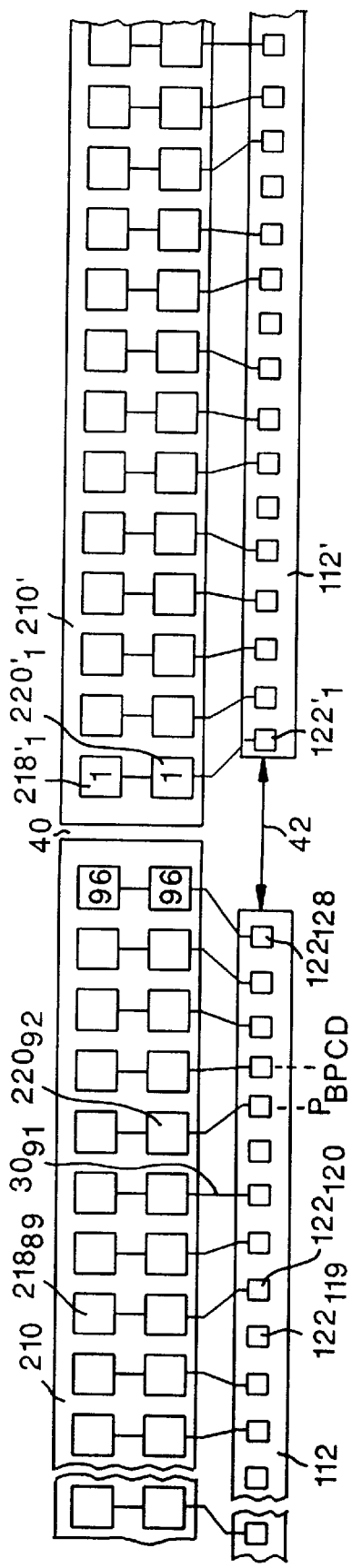
FIG. 4 is a schematic view of a second example of the interconnection of a conventional driver circuit IC with a conventional LED printhead wherein the number and pitch of the driver circuit and LED wirebonding pads differs and the length of the driver circuit and LED chip arrays differ.

Referring again to FIG. 3, the current driver ICs 112, 112' (maximum resolution of 400 DPI) have all wirebond pads 122 and 122' connected by wires 30 to the LED element pads 120, 120' which are connected to a corresponding LED element 118, 118' on 400 DPI LED arrays 110, 110'. FIG. 4, by contrast, shows the same current driver ICs 112 and 112' connected to end-to-end 300 DPI LED array 210 and 210'. In this example, selected ones of the driver IC output pads 122, 122' are skipped (i.e., not connected to an LED array pad 220, 220') in a sequence that is optimized to provide the shortest connection of the wires 30 to a pad 220, 220' on the LED arrays 210, 210'resulting in 400 DPI current driver ICs 112, 112' driving 300 DPI LED array ICs 210, 210'. Again, the spacing 42 is exaggerated for effect.

The selection of the driver IC pads 122, 122' for connection in the single sided example of FIG. 4 may be accomplished by mathematically determining the nearest pairs of pads from sets of bonding pad position data derived from the following formulas for N LED elements and corresponding LED element pads for each LED array 210, 210'. The formulas for deriving the sets of position data employ the LED array element pitch length $P_{LED}$. The term pitch length refers to distance between corresponding parts of adjacent like elements such as the distance between the centers of the elements.

Consider the case of FIG. 3 wherein a 128 channel driver chip 112 is connected for driving a 128 element LED chip array. Assume that the number of LED bond pads 120 is generally denoted as N, the LED pitch length is $P_{LED}$ and if the center of the LED chip array is defined as our distance origin "O" then the LED centers are located at $$D_{LED} = \pm[(\tfrac{1}{2}P_{LED} + (m-1)P_{LED}] \text{ for } 1 \leq m \leq N/2. \qquad \text{Eq. 1}$$

This expression merely means that the distance to the right (+) or left (−) of our origin "O" to any LED m is the one half LED pitch length to the first LED plus the (m−1) pitch lengths to the center of LED m. However, this simple model, while true for the LEDs, must be altered to reflect the following manufacturing concerns if we are to calculate the positions of the LED bonding pads. For assembly reasons, it is desirable to have the total array length less than $N \times P_{LED}$ to allow for gaps between arrays when assembled. Also for scribing and cleaving of arrays, it is desirable to angle the nitride at the outer edges, thereby reducing the length useful for bonding pads. If we consider the sum of the manufacturing concerns to reduce the array length at each end to be the dimension "S" (see FIG. 5) and that each of the bonding pads has its center shifted towards the origin "O" by a factor S/(½×N) so that a uniform bonding pad size pitch length prevails then, $$D_{LEDBP} = \pm[(\tfrac{1}{2}P_{LED} - 2S/N) + (m-1)(P_{LED} - 2S/N)] \text{ for } 1 \leq m \leq N/2 \qquad \text{Eq. 2}$$

where $D_{LEDBP}$ is the right, left distance from the origin "O" of any LED bonding pad.

A similar approach can be applied to the driver IC analysis wherein the driver IC length is reduced for manufacturability a) to avoid close alignment at butting gaps and b) some die area is required for a hermetic seal and ground zone. If we consider the sum of the manufacturing concerns to reduce the driver length at each end by "T" and further assume that the center of the driver IC chip is aligned with the center of the LED chip array; i.e. they have the same origin "O" and that the driver IC bonding pads have centers that are uniformly spaced on the chip then the distance to any driver chip bonding pad can be expressed as $$D_{DVRBP} = \pm[\tfrac{1}{2}(P_{LED} - 2T/N) + (m-1)(P_{LED} - 2T/N)] \text{ for } 1 \leq m \leq N/2 \qquad \text{Eq. 3}$$

Figures 5, 6B:
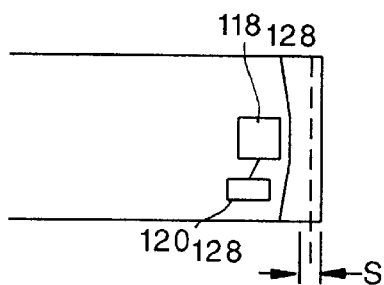

With reference now to the tables of FIGS. 6A and 6B, column A represents the numbers m from 1 to 64. Recall that the LED chip array and driver chip in FIG. 3 each have N=128 bonding pads but only 64 to each of the left and right of the origin "O". In column B, the pitch length is assumed to be 63.5 μm and $D_{LED}$ is calculated using equation 1 for each of the 64 positions to the right of the origins. In column C, the dimension "S" is assumed to be 20 μm and $D_{LEDBP}$ is calculated using equation 2 for each of the 64 bonding pads which correspond to the 64 positions. In column D, the dimension "T" is assumed to be 228 μm and $D_{DVRBP}$ is calculated using equation 3.

Now as shown in FIG. 4, the 128 channeled driver IC 112 is used with a N'=96 element LED chip array 210. The distances calculated above for the driver bonding pads are still relevant. With regard to the LED chip array 210, there is a new LED pitch length, $P'_{LED}$=84.66667 and it is assumed that the above S and T dimensions are similar for this case also since the overall chip dimensions as noted above for certain resolutions of chip arrays are not changed. In column F, there is shown a calculation of the distances, $D'_{LEDBP}$, to the 48 bonding pads on the LED chip array 210 that are to the right of the origin "0". The distances in column F are then compared to those of the driver chip bonding pads in column D to determine the closest fit. As can be seen in column F, the closest fit for LED bonding pad 220$_1$ is driver chip bonding pad 122$_1$. However, the closest fit for LED bonding pad 220$_2$ is driver chip bonding pad 122$_3$ thus causing driver chip bonding pad 122$_2$ to be skipped or not used. The table in column G indicates which of the 64 driver chip bonding pads are to be connected to the 48 LED bonding pads that are to the right of the origin. Since the chips are left-right symmetric of the origin, a similar result is provided to the left of the origin.

The analysis for providing a similar determination for the two-sided case may also be calculated mathematically using a similar approach but recognizing that bonding pads for LEDs are provided alternately on both sides of the LED chip array.

In lieu of performing the mathematics which merely calculate the distances from the centers of each array to respective bond pads, and because these distances are relatively constant in a batch of identical driver chips and in a batch of identical LED chip arrays, one need only pull a sample driver chip IC from the driver chip batch and sample LED chip array from the chip array batch and measure the distances from an origin at the center of the chip to the centers of the respective bonding pads to obtain the column D data and the column F data, respectively. The data in these columns are compared to obtain the identities of the closest driver bonding pads that are to be used (column G). The above approaches can be extended to driver chips having other than 128 bonding pads and LEDs having numbers of bonding pads different from those specifically illustrated in the above examples.

As described above, the selected set of N current driver IC bonding pads are wire bonded to the N LED bonding pads, leaving unselected current driver stages or channels unbonded. It is necessary to electrically bypass the unselected stages or channels so that the N line data bits are directed to the N current driver stages or channels. The selective wirebonding of a control mode pad to ground or bias potential is a first approach. This connection would take place during manufacturing in conjunction with the attachment of wire bonds between selected driver IC bonding pads and LED bonding pads. Another approach is configuration via a digital data input stream.

Additional or other techniques may be employed to accomplish the selection of the multi-resolution compatibility of the current driver IC. The current driver IC may include a control register having stages corresponding in number to the total number of current driver stages or channel. The control register stages may be loaded with mode selection data to allow for mode selection, where individual modes correspond to operation with specific resolution LED arrays. Another method would involve the use of dedicated mode select lines for each of the possible resolutions, where the selected mode always bypasses certain stages. In either of these approaches, it is expected that the exact same set of the current driver bonding pads of the standardized current driver IC is always connected to the LED array bonding pads and that it is only necessary to load the control register stages or enable the appropriate mode select line to match the resolution of the LED array.

While the above description of the present invention related to an electrophotographic system that uses a photosensitive drum, the invention is not limited thereto. Instead, the invention can be applied with the same effect to other systems, for example to a silver halide photographic system that uses a photosensitive silver halide agent. Other recording elements may be used such as thermal, electrographic, laser, inkjet, etc. in accordance with the teachings herein.

Similarly, the invention is not limited to the use of a self-focusing rod-lens array, and may instead use another optical system or dispense with any optical system and instead use a direct image formation arrangement. Also, while the foregoing description uses the example of wire bonding to connect the electrodes with the drive circuits, it is to be understood that other wiring methods may be applied without departing from the scope of the invention, such as tape-automated bonding (TAB) system that uses a film carrier.

The invention having been described in detail with particular reference to certain preferred embodiments thereof will be understood to encompass variations and modifications thereof and equivalents thereto within the spirit and scope of the invention defined by the appended claims.

What is claimed is:

1. A light-emitting diode print head comprising:
   a light-emitting diode chip array comprising a first plural number of input bond pads and light-emitting diode elements each coupled to one of said pads, the first plural number of input pads arrayed in a first row in a first direction and separated apart in a first pitch spacing;
   a current driver integrated circuit (IC) chip array comprising a second plural number of driver channels and output bond pads coupled thereto, the second plural number of output pads arrayed in a second row in the first direction and having a second pitch spacing different from the first pitch spacing and the second plural number of bond pads being greater in number than the first plural number of input pads;
   a support supporting the light-emitting diode chip array and the current driver integrated circuit chip array in side by side relationship with a gap between the input pads and the output pads; and
   interconnection means extending between and electrically connecting each input pad of the input pads in the first row with a respective different output pad of a first sub-set of the output pads of the second row such that each of the input pads is electrically connected across the gap to the nearest one of the output pads.

2. The printhead of claim 1 wherein said interconnection means further comprises conductive wires extending across the gap and each of said wires is bonded to an input pad and a selected output pad in the first sub-set of output pads.

3. The print head of claim 1 wherein the printhead further comprises a plurality of light-emitting diode chip arrays of light-emitting diode elements and input pads, the light emitting diode chip arrays being arranged end to end in a row in the first direction and each of the chip arrays comprising a said light-emitting diode chip array and a plurality of current driver IC chip arrays arranged end to end in a row in the first direction and each of the current drives IC arrays comprising a said current driver integrated circuit chip array and a said interconnection means electrically connecting each light-emitting diode chip array with a respective current driver IC chip array.

4. The printhead of claim 1 and wherein the light-emitting diode chip array is longer than the driver IC array and a pitch length between adjacent ones of said input bond pads is longer than a pitch length between adjacent ones of said output bond pads.

5. The printhead of claim 4 and wherein the interconnection means comprises conductive wires and wherein some of the wires are not parallel with others of said wires.

6. The printhead of claim 1 and wherein the interconnection means comprises conductive wires and wherein some of the wires are not parallel with others of said wires.

7. A recording member comprising:
   a recording element chip array comprising a first plural number of input bond pads and recording elements each coupled to one of said pads, the first plural number of input pads arrayed in a first row in a first direction and separated apart in a first pitch spacing;
   a current driver integrated circuit (IC) chip array comprising a second plural number of driver channels and output bond pads coupled thereto, the second plural number of output pads arrayed in a second row in the first direction and having a second pitch spacing different from the first pitch spacing and the second plural number of bond pads being greater in number than the first plural number of input pads;

a support supporting the recording element chip array and the current driver integrated circuit chip array in side by side relationship with a gap between the input pads and the output pads; and interconnection means extending between and electrically connecting each input pad of the input pads in the first row with a respective different output pad of a first sub-set of the output pads of the second row such that each of the input pads is electrically connected across the gap to the nearest one of the output pads.

8. A method of assembling and interconnecting a plurality of recording elements of a printhead with output stages of a driver IC having a higher dot per inch capability than a predetermined dot per inch resolution of the recording elements, the recording elements being arranged in a first chip array including at least a first plural number of input bonding pads arranged in a first row and recording elements each coupled to one of said input pads, the first plural number of input bonding pads being spaced apart in a first direction, with a first pitch spacing, along said row, the driver IC being embodied in a second chip array including a second plural number of output bond pads and a second plural number of driver channels each associated with one of said output pads, the second plural number of output pads being greater in number than the first plural number of input pads and spaced apart, with a second pitch spacing different from the first pitch spacing, in a second row in said first direction; the method comprising the steps of:

supporting the first and second chip arrays in side by side relationship with a gap between the first plural number of input pads and the second plural number of output pads; and electrically connecting each input pad of the first plural number of input pads with a respective different output pad of a sub-set of the second plural number of output pads such that each of the first plural number of input pads is electrically connected across the gap to the nearest output pad among the sub-set of the second plural number of output pads.

9. The method of claim 8 and including a step of selecting the sub-set of the second plurality of output pads by:

establishing first and second starting points along the first and second arrays;

determining a position of each input pad with respect to the first starting point along the first array;

determining a position of each output pad with respect to the second starting point along the second array; and comparing the positions of the output pads to the positions of the input pads to identify sets of output and input pads having comparable positions with respect to the first and second starting points.

10. The method of claim 9 wherein the supporting step further comprises the step of aligning the first and second arrays so that the first and second starting points are positioned directly across the gap from one another and the first and second arrays extend in the first direction.

11. The method of claim 8 and including the step of selecting the sub-set of the second plurality of output pads by:

establishing first and second starting points at the mid-points along the first and second arrays, respectively, of the input and output pads;

determining a position of each input pad with respect to the first starting point along the first array in the first and a second direction both extending away from the mid-point on the first array;

determining a position of each output pad with respect to the second starting point along the second array in the first and the second directions extending away from the mid-point on the second array; and comparing the positions of the output pads to the positions of the input pads in the first direction and those in the second direction to identify first and second sets of output and input pads having comparable positions with respect to the first and second starting points.

12. The method of claim 11 wherein the selecting step further comprises:

selecting the output pads immediately adjacent to the second starting point for inclusion in the sub-set of output pads for electrical connection to the respective input pads immediately adjacent to the first starting point.

13. The method of claim 12 wherein the supporting step further comprises the step of aligning the first and second arrays so that the first and second points are positioned directly across the gap from one another.

14. The method of claim 11 wherein the supporting step further comprises the step of aligning the first and second arrays so that the first and second points are positioned directly across the gap from one another.

15. The method of claim 8 wherein the first array is longer than the second array and a pitch length between adjacent ones of said input bond pads is longer than a pitch length between adjacent ones of said output bond pads, the connecting step further comprises:

connecting input pads and output pads of the first and second arrays starting at mid-points of the respectively side-by-side aligned first and second arrays; and connecting the remaining output pads of the first sub-set from the output pads extending away from the mid-point and toward the ends of the second array that are closest across the gap from remaining input pads extending away from and toward the ends of each first array in a symmetric pattern and wherein some of the wires are not parallel with others of said wires.

16. The method of claim 8 and wherein the first array is longer than the second array and a pitch length between adjacent ones of said input bond pads is longer than a pitch length between adjacent ones of said output bond pads.

17. The method of claim 16 and wherein in the step of electrically connecting conductive wires are used and wherein some of the wires are not parallel with others of said wires.

18. The method of claim 8 and wherein in the step of electrically connecting conductive wires are used and wherein some of the wires are not parallel with others of said wires.

19. The method of claim 8 and wherein the recording elements are light-emitting diodes.

* * * * *